(12) United States Patent
Kovarik et al.

(10) Patent No.: US 11,479,322 B2
(45) Date of Patent: Oct. 25, 2022

(54) CHAIN DAMPER FOR A BICYCLE

(71) Applicant: STFU Bike Inc., Whistler (CA)

(72) Inventors: Christopher Kovarik, Whistler (CA); Jaan Peter Aked-Hurditch, Whistler (CA)

(*) Notice: Subject to any disclaimer, the term of this patent is extended or adjusted under 35 U.S.C. 154(b) by 290 days.

(21) Appl. No.: 16/808,545

(22) Filed: Mar. 4, 2020

(65) Prior Publication Data

US 2020/0283082 A1 Sep. 10, 2020

Related U.S. Application Data

(60) Provisional application No. 62/813,313, filed on Mar. 4, 2019.

(51) Int. Cl.
| | |
|---|---|
| *B62M 9/00* | (2006.01) |
| *B62M 9/126* | (2010.01) |
| *B62M 9/136* | (2010.01) |
| *B62M 9/128* | (2010.01) |
| *B62M 9/12* | (2006.01) |
| *B62M 9/138* | (2010.01) |

(52) U.S. Cl.
CPC .............. *B62M 9/00* (2013.01); *B62M 9/126* (2013.01); *B62M 9/136* (2013.01); *B62M 9/12* (2013.01); *B62M 9/128* (2013.01); *B62M 9/138* (2013.01); *B62M 2009/007* (2013.01)

(58) Field of Classification Search
CPC ...... B62M 9/121; B62M 9/126; B62M 9/128; B62M 9/131; B62M 9/136; B62M 9/138; B62M 9/00; B62M 9/12; B62M 2009/007; B62J 13/00; B62J 13/02; B62J 13/06; F16H 7/18; F16H 2007/185
See application file for complete search history.

(56) References Cited

U.S. PATENT DOCUMENTS

| | | | |
|---|---|---|---|
| 5,725,450 A | 3/1998 | Huskey | |
| 6,135,904 A | 10/2000 | Guthrie | |
| 6,454,671 B1 * | 9/2002 | Wickliffe | .................. F16H 7/22 474/82 |
| 6,533,690 B2 | 3/2003 | Barnett | |
| D510,548 S * | 10/2005 | Wickliffe | ............... B62M 9/136 D12/127 |
| 7,691,019 B2 * | 4/2010 | Gogo | ....................... B62J 13/00 474/140 |

(Continued)

FOREIGN PATENT DOCUMENTS

JP        H05193549 A * 11/2002 ...... B62M 2009/007

*Primary Examiner* — Michael R Mansen
*Assistant Examiner* — Raveen J Dias
(74) *Attorney, Agent, or Firm* — Eugene Derenyi

(57) ABSTRACT

A chain damper for use with a bicycle may include a base having an attachment region that is configured to be attached to a bicycle and a chain receiving portion extending from the base in a first direction. The chain receiving portion can include a chain damping surface that includes a resiliently deformable damping material and at least partially bounds a chain receiving aperture. The chain receiving aperture may extend in an axial direction and may be configured so that when the chain damper is attached to the bicycle the axial direction is substantially aligned with the primary chain direction and the chain damping surface is spaced apart from the chain travel path.

20 Claims, 13 Drawing Sheets

(56) References Cited

U.S. PATENT DOCUMENTS

| | | | | |
|---|---|---|---|---|
| 8,561,750 | B2* | 10/2013 | Kakimoto | F16H 7/18 474/140 |
| 9,919,765 | B2* | 3/2018 | Wickliffe | B62M 9/136 |
| 2002/0177498 | A1* | 11/2002 | Wickliffe | B62M 9/137 474/82 |
| 2006/0019782 | A1* | 1/2006 | Wickliffe | B62M 9/134 474/80 |
| 2007/0032324 | A1* | 2/2007 | Uchiyama | B62M 9/16 474/140 |
| 2007/0265121 | A1* | 11/2007 | Gross | B62J 13/00 474/144 |
| 2008/0032835 | A1* | 2/2008 | Reynolds | B62M 9/136 474/80 |
| 2009/0220319 | A1* | 9/2009 | Weagle | B62M 9/126 411/103 |
| 2012/0248730 | A1* | 10/2012 | Sloan | B62M 9/16 280/210 |
| 2013/0053196 | A1* | 2/2013 | Emura | B62M 9/136 474/140 |
| 2013/0190118 | A1* | 7/2013 | Luede | B62M 9/16 474/140 |
| 2016/0265633 | A1* | 9/2016 | Miles | B62M 9/136 |
| 2019/0127023 | A1* | 5/2019 | Fujimoto | B62M 9/126 |

\* cited by examiner

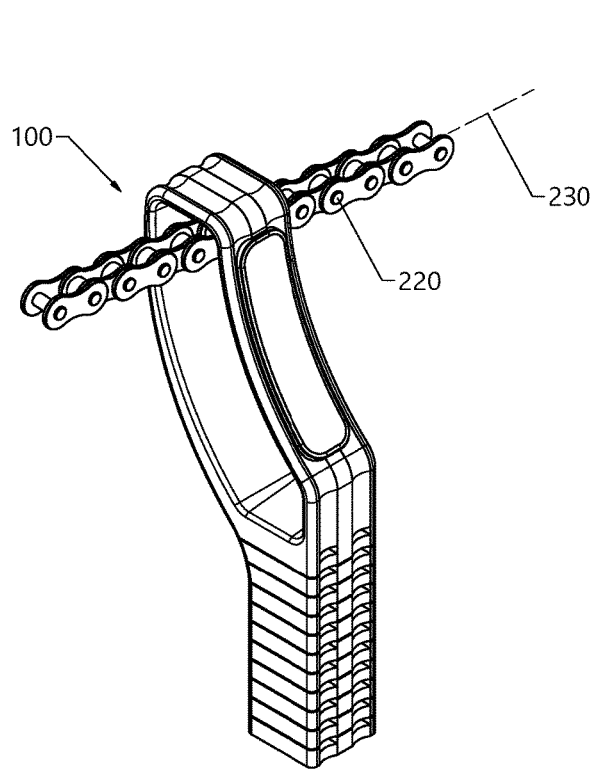 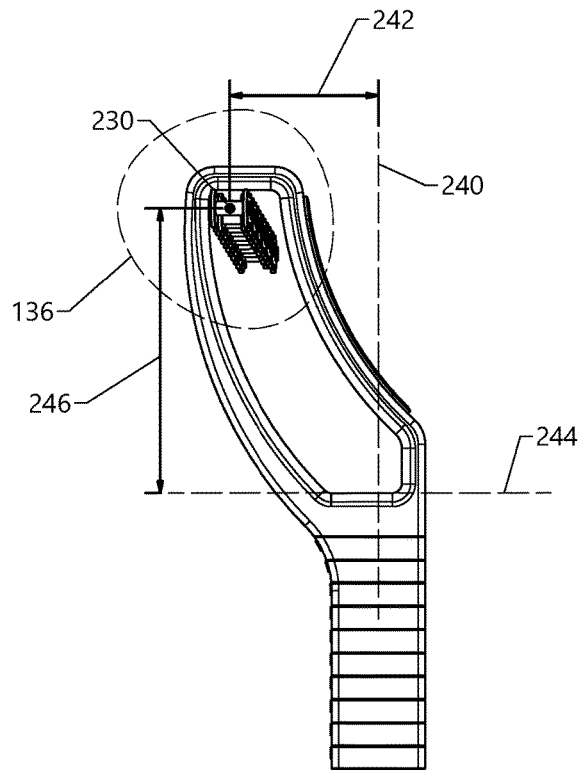
FIG. 8  FIG. 9
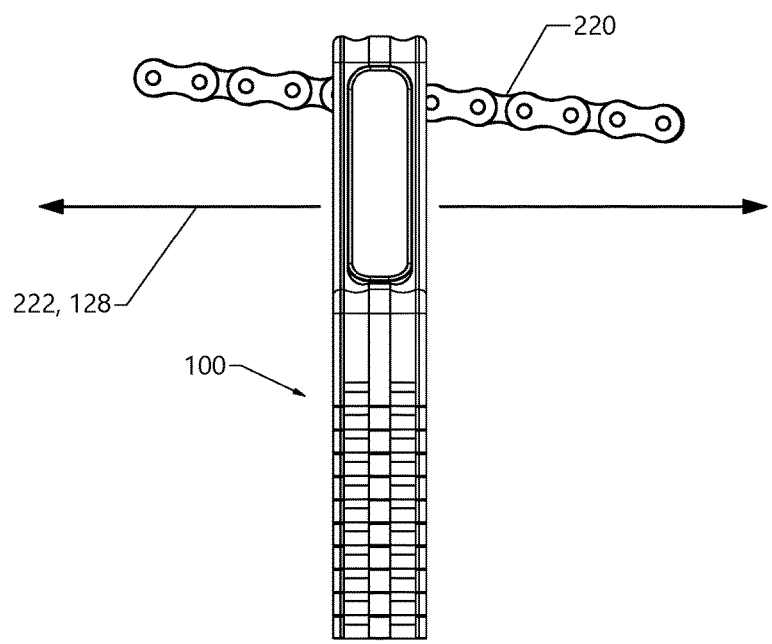
FIG. 10

SECTION 16-16

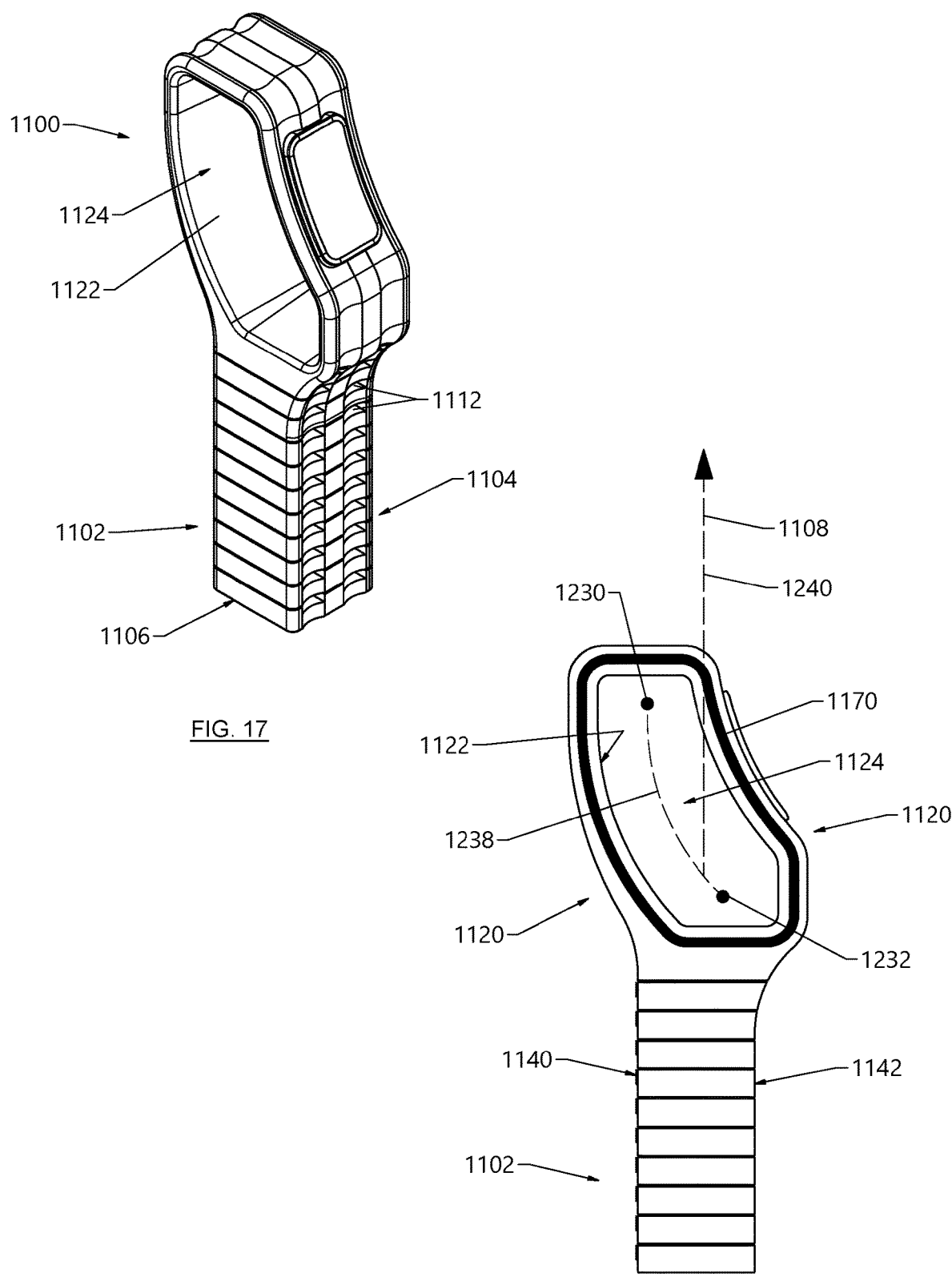

CHAIN DAMPER FOR A BICYCLE

CROSS-REFERENCE TO RELATED APPLICATION

The present application claims the benefit of U.S. provisional patent application No. 62/813,313 filed on Mar. 4, 2019, the entirety of which are hereby incorporated by reference.

FIELD OF THE INVENTION

In one of its aspects, the present disclosure relates to a chain damper that can be used in combination with a bicycle, and in particular a chain damper that can be used with a bicycle that is travelling off-road and/or across rough terrain.

Introduction

U.S. Pat. No. 5,725,450 discloses a device for preventing derailment of a bicycle chain of a bicycle. Upper and lower guide members are positioned strategic to a drive sprocket of the bicycle to guide and maintain the chain in engagement with the drive sprocket regardless of the tension of the chain. The upper and lower guides force the chain to be engaged a longer circumferential distance on the drive sprocket to prevent the chain from jumping off the drive sprocket. Circular guards are mounted on each side of the drive sprocket to protect the drive sprocket and the chain entrained thereon from impact. The spacing of the circular guards provides a channel for receiving the chain as it traverses the drive sprocket.

U.S. Pat. No. 6,533,690 discloses a bicycle including a conventional pedal crank and chain drive together with a conventional derailleur shifting mechanism operative to selectively transfer the drive chain between alternative rear sprockets of the bicycle drive system. A chain ring is rotatable in response to pedal crank rotation to transfer pedal crank power to the rear sprockets. A pair of guide blocks define respective internal guide channels through which the drive chain passes toward and from engagement with the chainring. The guide blocks are maintained at their respective positions by a guide support plate secured to the bicycle frame.

U.S. Pat. No. 6,135,904 discloses a damper that functions in cooperation with the chain take-up to introduce improved smoothness during bicycle operation. The hydraulic damper is a cylinder that has a spring driven piston mounted in it. The spring is controlled by a fluid within the cylinder. This fluid smoothes out or otherwise controls jerky or other unwanted vibration by applying fluid forces to the take-up piston so that a relatively constant pressure is applied against the drive chain. This allows that chain to flow over the sprockets and chain slides without, looseness, unintentional gear shifts or objectionable noise.

These devices are generally configured to be used in close proximity to and/or to be connected to the front chainring, rear cassette and/or rear derailleur of a bicycle. In these locations there remains a relatively long segment of the bicycle chain that extends between the chainring and the cassette that is not engaged by conventional chain-engaging devices. Due at least in part to the flexibility of bicycle roller chains, these long sections of chain may still tend to deflect laterally (i.e. side to side when the bike is in motion) and/or vertically (i.e. up and down when the bide is in motion) in a manner that may contribute to noise, chain wear, bicycle and other component fatigue and/or damage and the like.

Despite the existence of chain-engaging devices that co-operate with at least one of the front chainring, rear cassette and/or rear derailleur of a bicycle there remains a need for an apparatus that can engage the relatively long and relatively unsupported sections of chain that extend between the drive train components.

SUMMARY

The teachings described herein are generally directed to an apparatus that can be used to help limit unwanted movement of a bicycle chain, particularly while the bicycle is being ridden off-road, down-hill or otherwise over rough and bumpy terrain that would cause the chain to vibrate and flex. The apparatus may also preferably dampen the movements of the chain by absorbing at least some of the energy in the chain, for example by using deformable and preferably resilient materials to help function as a damper or shock/energy absorbing material.

Unlike some conventional techniques that try to limit chain movement by removing slack and increasing chain tension (including, for example, active damping cylinders, idler gears or pulleys and extra sprockets/gears and the like) the teachings herein relate to a device that preferably does not contact the chain while the chain is moving along its normal, preferred travel path between the chain ring and the rear cassette, while still having surfaces that are relatively close to the periphery/boundary of the preferred chain travel path so that the apparatus can contact the chain if and/or when the chain deviates laterally, vertically, or in both directions away from its standard path. Limiting engagement with the chain to substantially only the time when the chain has been displaced from its desired path may help reduce any friction or resistive forces acting on the chain, which may require extra user energy to overcome and/or may contribute to relatively faster wear of the chain, the damping apparatus or other features.

Also, unlike existing chain guides or limiting devices that are positioned in close proximity to the chain ring or rear cassette, the teachings described herein relate to an apparatus that can be positioned along the length of the chain and in the region that is between the chain ring and the rear cassette, in which the chain is generally unsupported and prone to deflection.

In accordance with one broad aspect of the teachings described herein, a chain damper is described for use with a bicycle having a chain extending in a primary chain direction between a chain ring and a rear cassette and moving along a chain travel path. The chain damper may include a base having an attachment region that is configured to be attached to a bicycle and a chain receiving portion extending from the base in a first direction (e.g. upwards or downwards). The chain receiving portion may include a chain damping surface that includes a resiliently deformable damping material and at least partially bounds a chain receiving aperture. The chain receiving aperture may extend in an axial direction and may be configured so that when the chain damper is attached to the bicycle i) the axial direction is substantially aligned with the primary chain direction and ii) the chain damping surface is spaced apart from the chain travel path. In this configuration when the chain damper is attached to the bicycle and the chain is travelling along the chain travel path the chain may be freely received within the chain receiving aperture and the chain damping surface may be positioned so as to be contacted and deformed by the chain when the chain is laterally displaced from the chain travel path thereby dissipating at least some kinetic energy from the chain and to resiliently urge the chain back toward the chain travel path.

The chain may be at least laterally and preferably also vertically moveable between an inboard travel path in which it engages an inboard most sprocket of the cassette and an outboard travel path in which it engages an outboard most sprocket of the cassette and the chain receiving aperture includes an inboard region configured to freely receive the chain when in the inboard travel path and an outboard region configured to configured to freely receive the chain when in the outboard travel path.

The outboard region may be laterally offset from the inboard region and may be disposed between the inboard region and the base in the first direction.

The base may include an inboard face that generally faces the bicycle when the chain damper is attached to the bicycle and an opposing outboard face. At least a portion of chain engaging surface may be disposed inboard of the inboard face.

The chain engaging surface may be formed substantially entirely from the damping material.

The chain receiving portion may be formed substantially entirely from the damping material and wherein at least a portion of the chain receiving portion is laterally displaceable when contacted by the chain.

The chain damping material may has a durometer of between about 10 Shore A and about 90 Shore A.

The chain damping material may include at least one of rubber, plastic, silicone, TPU (thermo plastic poly urethane) and a combination thereof.

The chain damping surface may surround the entire chain receiving aperture.

The chain receiving portion may be of integral, one-piece construction.

The chain damper may be of integral, one-piece construction and may be formed from the chain damping material.

The chain receiving aperture may be a closed aperture that encloses the chain when the chain damper is attached to the bicycle whereby the chain is not laterally or vertically removable from the chain receiving aperture when the chain damper is attached to the bicycle.

The chain receiving portion may include a frame that is formed from a frame material that is stiffer than the chain damping material and at least partially supports the chain damping surface.

The frame material may have a durometer of between about 40 Shore D and about 100 Shore D.

The attachment region may be configured to be attached to a frame of the bicycle between chain ring and the cassette in the first direction.

The attachment region may include a base surface configured to bear against the frame of the bicycle and a fastening portion having at least one fastener aperture configured to receive a fastener to secure the base to the frame.

The attachment region may include a least a first fastener aperture and a second fastener aperture spaced apart from each other in the first direction.

The chain receiving aperture may have a length in the axial direction that is between 0.5 cm and 10 cm.

At least a portion of the chain damping surface may be arcuate and may be configured to have shape that is complimentary to a shape of the chain transition path defined by movement of the chain between an inboard travel path and an outboard travel path.

The damping material may include a lubricant that can be transferred to the chain when the chain contacts the chain engaging surface.

Other advantages of the invention will become apparent to those of skill in the art upon reviewing the present specification.

BRIEF DESCRIPTION OF THE DRAWINGS

Embodiments of the present invention will be described with reference to the accompanying drawings, wherein like reference numerals denote like parts, and in which:

FIG. 8 is a perspective view of the chain damper of FIG. 1 with a chain shown in an upper and/or inboard position;

FIG. 9 is a side view of the chain damper and chain of FIG. 8;

FIG. 10 is a front view of the chain damper and chain of FIG. 8;

FIG. 17 is a perspective view of another example of a chain damper;

FIG. 18 is a side view of the chain damper of FIG. 17;

DETAILED DESCRIPTION

Figure 1:
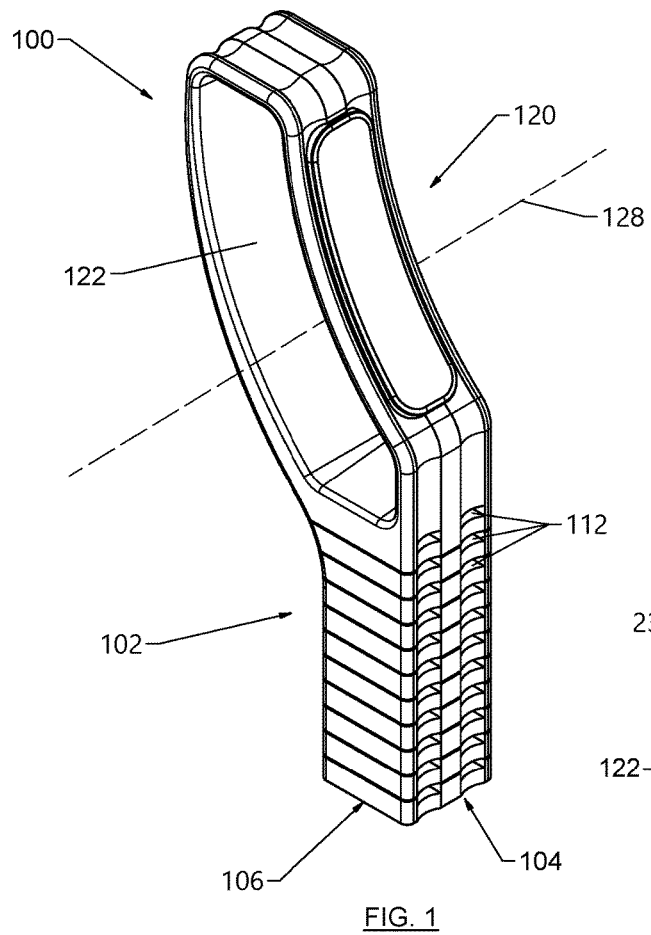
FIG. 1 is a perspective view of one example of a chain damper.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim, or dedicate to the public any such invention by its disclosure in this document.

Chain drive systems used on bicycles commonly include a chain running between a chain ring (e.g. sprocket mounted to the crank arm axle), a rear cassette (e.g. one or more sprockets of varying diameters mounted to the rear wheel) and a derailleur (mounted to the rear triangle of the bicycle). In these arrangements, the chain may travel along a chain travel path and may extend in a primary chain direction, which in most bicycles is substantially aligned with or parallel to the forward/back ward direction of the overall bicycle, as the chain ring is typically positioned forward of the rear wheel axel and the rear cassette. The derailleur is used to shift the chain on to different sized sprockets resulting in different gear ratios. While the orientation of the chain may deviate slightly (e.g. within a few degrees) from the forward/backward direction either laterally, vertically or both while the bicycle is in use (for example, based on the current gear, size of the chain ring, etc.) it is understood that the chain is still travelling along its path and in the primary, forward/backward chain direction when at rest and/or under normal, smooth operating conditions.

In configurations in which the rear cassette has two or more sprockets it is conventionally arranged with the larger-diameter sprockets position at the inner or inboard side of the cassette and with the relatively smaller sprockets being provided on the outer or outboard side of the cassette. In such configurations, the position of the rear portion of the chain may move laterally between the inner and outer most sprockets as the bicycle is in use which may change is angle slightly relative to the chain ring. This may also modify the height/vertical position of the chain. For a given drive train, the travel path of the chain may be understood to include i) an inboard travel path that is occupied when the chain is on the inner most sprocket and is therefore in a laterally inner-most and vertically highest position, and an ii) outboard travel path that is occupied that is occupied when the chain is on the outer-most sprocket and is therefore in a laterally outer-most and vertically lowest position. Both of these examples of chain travel paths can be considered to be extending generally in the primary chain direction and references herein to the chain direction and chain travel path are made taking these slight variations into account, as would be understood by persons skilled in the art.

The lateral and/or vertical movement of the chain between the inboard and outboard travel paths may define a chain transition path, which may be generally linear, arcuate or a combination thereof depending on the configuration of a given drive train.

In some riding situations, such as when the bicycle is ridden over rough terrain, impact forces may cause the chain to deviate or deflect from its intended travel path to be displaced either laterally (left/right or inboard/outboard), vertically or both from the primary chain direction. Under some conditions the chain may vibrate and/or oscillate in a relatively uncontrolled and undamped manner both up and down and side to side (in the vertical and lateral directions).

These vibrations and/or oscillations of the chain may contribute to a variety of problems and may be general undesirable. For example, undesirable noise can be created when a displaced chain impacts the frame or other portions of the bicycle (such as the chain stay and seat stay). The chain may also impact with the spokes of the rear wheel, which may detract from its intended performance. In addition to noise, such impacts between the chain and other portions of the bicycle can result in damage to the chain, the bicycle or both. This may accelerate the wear of the affected components.

Also, repeated and relatively large amounts of lateral displacement or flexing of the chain, such as in response to a plurality of bumps and impacts during an off-road ride, may accelerate the wear of the chain itself, as it may become too flexible in the non-primary chain travel directions. Increased lateral flexibility in a chain, beyond its intended flex tolerances, may contribute to relatively poor shifting performance and may require earlier than anticipate chain replacement. A certain amount of lateral flex is desirable for the chain to be able to shift onto each sprocket on the cassette, however, once the chain is too worn and laterally flexible, the flex between the upper pulley wheel on the derailleur and the corresponding sprocket on the cassette may become too large and shifting may be impaired. Chains on downhill mountain bikes that experience rough surfaces and minimal pedaling forces may tend to wear out this way before they wear out due to pedaling and subsequent chain growth wear.

The chain dampers described herein may help to reduce at least some of the issues described herein by helping to containing the chain, and limit its deflection, using a chain retaining aperture or loop-like structure that is shaped to receive the chain and through which the chain passes while traveling along its travel path. The structure bounding the chain retaining aperture, or at least its chain engaging surfaces, may be formed from a relatively flexible and preferably resiliently deformable material that can help absorbing at least some of the displacement energy, and optionally damp any oscillations, as well as generally inhibiting the displacement of the chain—and if the material is sufficiently resilient it may also help urge the chain back toward its travel path. This may help reduce the magnitude of the lateral and/or vertical chain displacement. The damper may, for example, limits the distance the chain can deflect, thereby reducing the lateral wear on the chain and/or reducing the chance of the chain impacting with parts of the bicycle frame and making noise/causing damage to both the chain and the bicycle frame.

The chain damper may be constructed in such a way that the body or attachment portion of the device is positioned outside the normal of the normal chain travel path, when the chain is under tension, so that in the absence of shocks or chain deflections is very little and preferably no contact between the chain damper and the chain. That is, the chain is preferably freely received to pass through the chain retaining aperture in the absence of chain deflections. This may help ensure that there is little to no additional friction added to the chain drive system when using the chain damper. The chain receiving aperture is preferably configured so that the chain freely passes through the aperture when in normal use in both is inboard travel path and its outboard travel path, and for all intermediary travel paths therebetween. This is different than traditional guides that may use either idler pulleys or direct friction applications.

Optionally, the chain damper can be shaped in any suitable configuration, including a relatively smaller oval shape that would typically be used on downhill mountain bike gearing (e.g. a short range chain damper) and a relatively larger, more elongated design that would be used with wider range gearing e.g. wide range chain damper to accommodate a greater lateral and vertical offset between the inboard and outboard travel paths) as typically used on an enduro or cross-country type bicycle. That is, the chain engaging portions of the dampers described herein can be configured meant to entirely encircle and/or enclose the chain relatively closely so as to keep it 'in place' and away from impacting parts of the bicycle frame but not so close that the chain contacts the chain damper when under tension and in its intended travel path. This would cause unnecessary friction to the drivetrain which for obvious reasons is undesirable. The shape can be changed to suit gearing and the associated cassette size which is dependent on the type of bicycle the chain damper will be fitted to. An alternate size 13 used for downhill specific bicycles with a narrower gearing range is also shown.

Preferably, such at least the chain engaging portions of a chain damper may be flexible enough to help absorb impacts and energy from the chain but preferably not so flexible that the damper collapses or deforms while in use or the chain can simply knocks the damper out of the way without offering at least some resistance to its momentum and retardation of the displacement of the chain. In a similar way the chain damper should preferably not be too stiff or rigid such that chain simply deflects off the device, without sufficient damping and energy dissipation, as this may cause similar noise and potential wear to the chain as would have occurred had the chain been allowed to move and strike the frame, spokes or other hard portions of the bicycle. Some examples of suitable materials that can be used in the chain contacting portion can include rubber, plastic, silicone and the like.

Optionally, the properties, such as the durometer, of the resiliently flexible damping material used in the damper can be selected based on a variety of factors, such as the shape and thickness of the design in order to arrive at a suitable damping characteristic for the device. In some embodiments the damping material may have a durometer of between about 10 Shore A and about 90 Shore A, and optionally may have a durometer between about 20 Shore A and about 80 Shore A, between and 30 Shore A and about 70 Shore A and the like. While some examples of suitable durometers are included, the damping material may be considered to have suitable properties if can at least partially absorb some of the kinetic/mechanical force exerted on it by the chain by/through dissipating the kinetic energy by being generally soft enough to move/deform when impacted by the chain. At the same time it is preferably that the damping material is not too soft so as to be completely deformed by the chain and offer virtually no resistance to the chain movement and/or as it will wear out relatively quickly when in use. A material that is relatively softer may provide better damping and energy absorbing characteristics and may last long enough for it to be viable, especially for racing or other special purposes. The damping material could also be made replaceable (stick on or clip in, etc), which my allow it to be replace without having to replace the entire chain damper. This may help reduce the inconvenience associated with its relatively faster wearing.

Optionally, the chain engaging portions of the damper may be of integral, one-piece construction and may have a generally homogeneous make-up. This may help simplify construction of the dampers. Alternatively, at least some portions of the damper may include at least two different materials, such as a stiffer material that can help provide structural support to the chain engaging portion and that can be combined with a thinner section design to give the desired characteristics.

Similarity, a softer material can be combined with a thicker section design to also give the desired result. Testing of various materials and designs, combined with slow motion video testing have been conducted and have provided useful results confirming the suitability of such a structure.

Optionally, two or more dampers may be used together on a single bicycle. The dampers may be configured to extend generally upwardly from the frame of the bicycle, and/or may be configured to extend generally downwardly from the bicycle frame.

Figure 15:
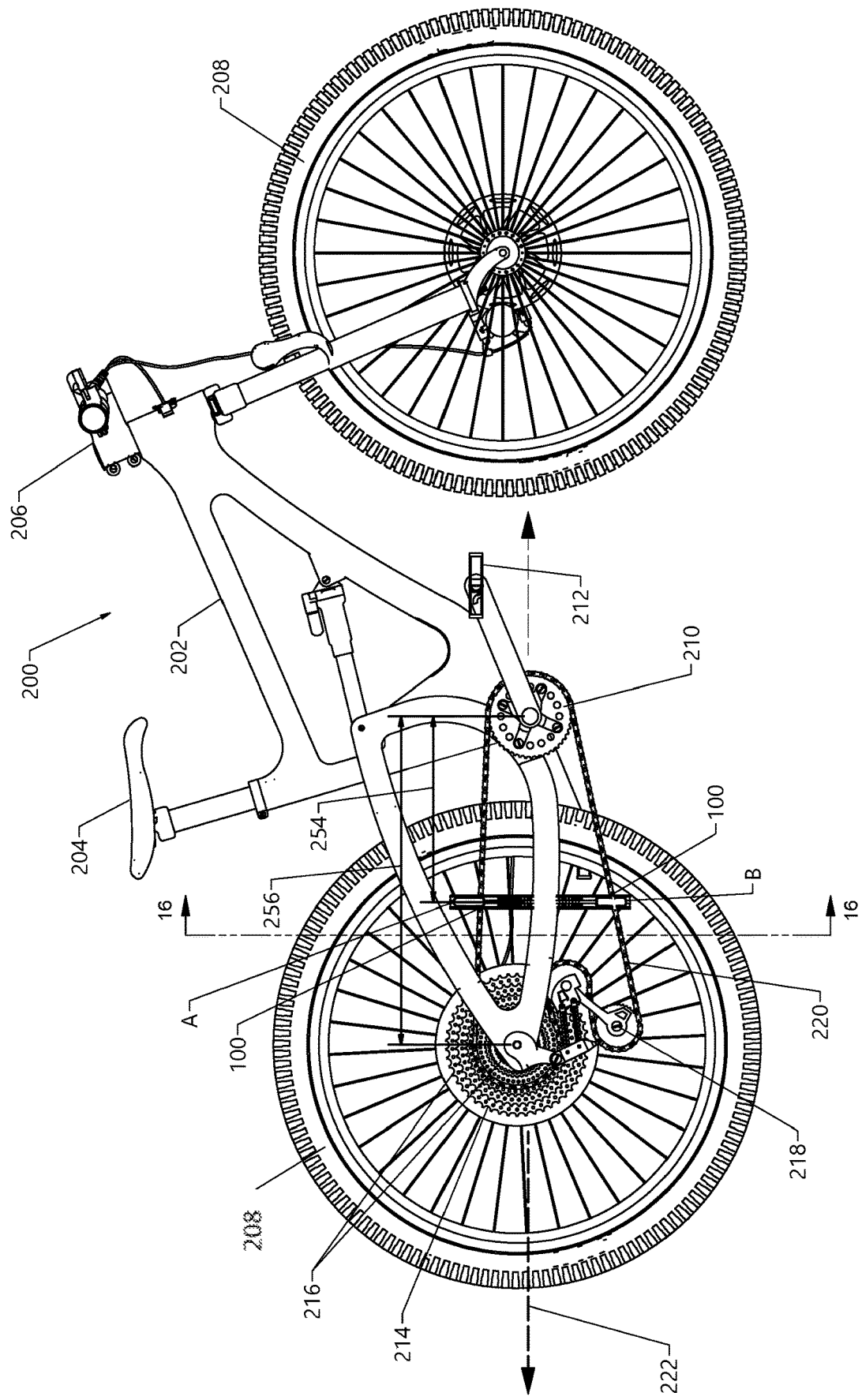
FIG. 15 is a side view showing two examples of chain dampers connected to a bicycle.

Referring to FIGS. 1 and 15, one example of a chain damper 100 that is configured to use with a bicycle 200 is illustrated. The bicycle 200 may be any suitable bicycle, and in the embodiment illustrated includes a frame 202, seat 204, handle bars 206 and wheels 208. The bicycle 200 also has a drive train that includes a chain ring 210 that can be driven by pedals 212, a rear cassette 214 having a plurality of sprockets 216 and associated derailleur 218. While shown as having a cassette 214 with multiple sprockets 216, the chain dampers described herein may also be used on bicycles having only a single rear sprocket and without a rear derailleur. The drive train also includes a chain 220 that extends between the chain ring 210 and a rear cassette 214 and moves in a primary chain direction (illustrated using arrows 222) along a chain travel path that can be understood as the path the chain traces with the chain ring is turning but absent any significant shocks or bumps.

Figure 2:
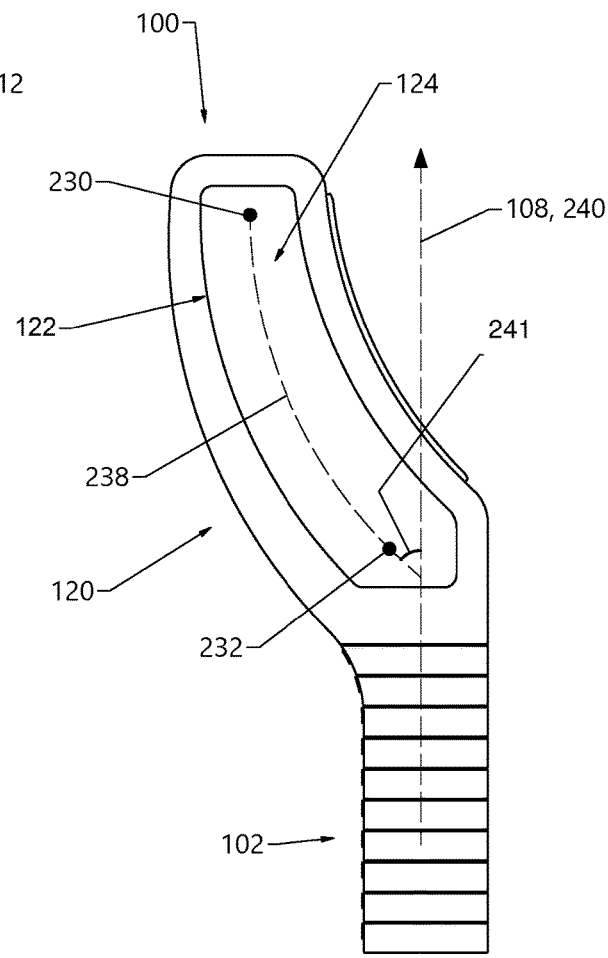
FIG. 2 is a side view of the chain damper of FIG. 1.
Figure 3:
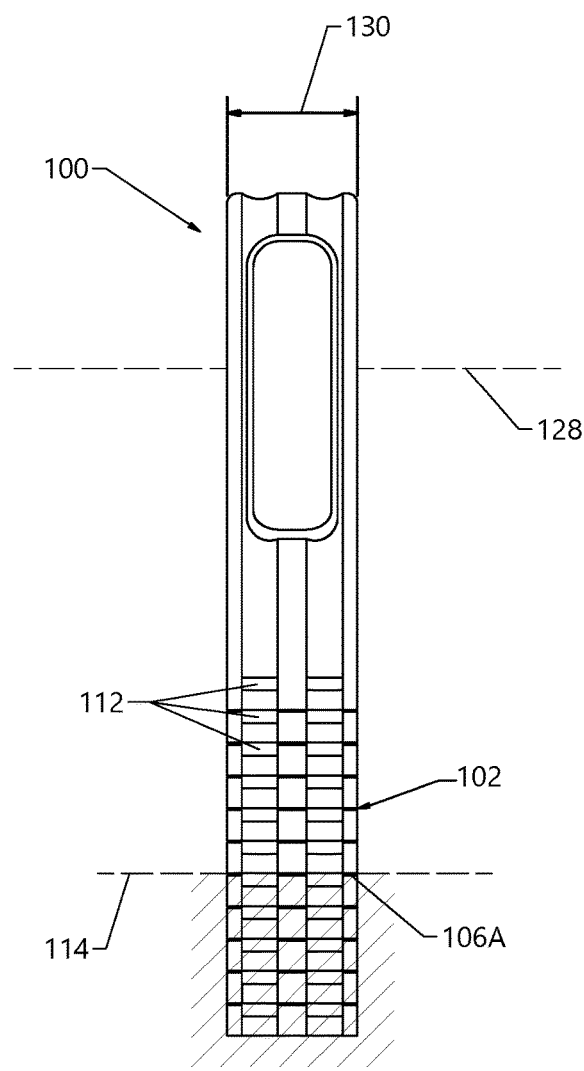
FIG. 3 is a front view of the chain damper of FIG. 1.
Figure 4:
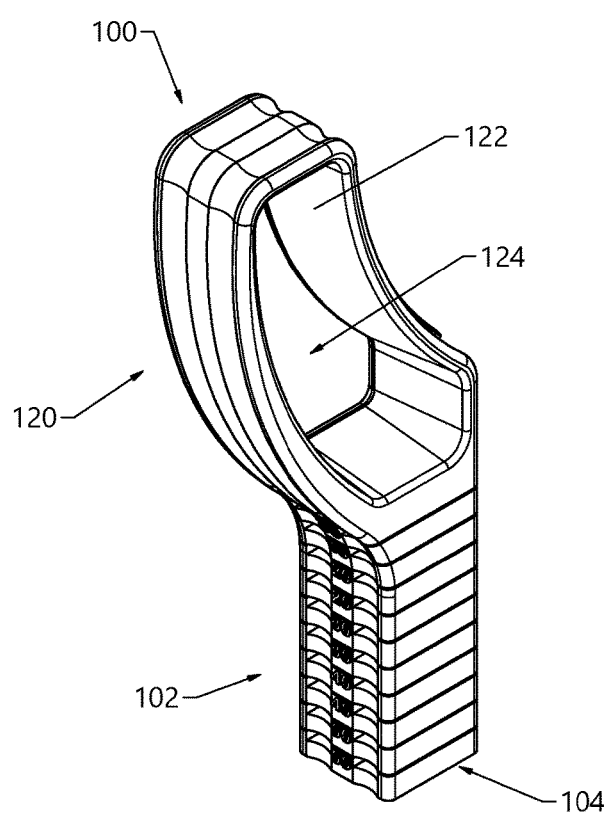
FIG. 4 is another perspective view of the chain damper of FIG. 1.
Figure 5:
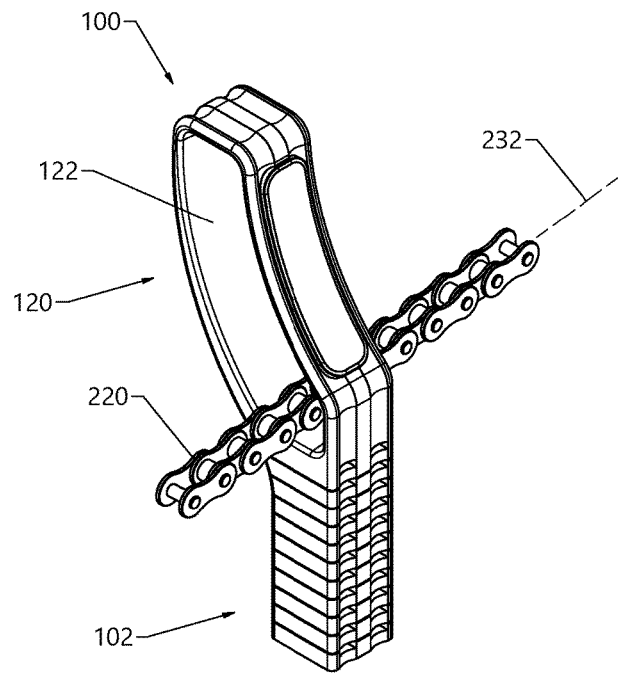
FIG. 5 is a perspective view of the chain damper of FIG. 1 with a chain shown in an lower and/or outboard position.
Figure 6:
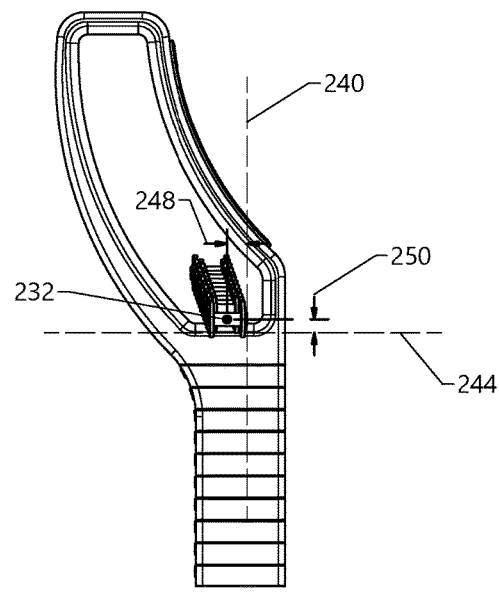
FIG. 6 is a side view of the chain damper and chain of FIG. 5.
Figure 7:
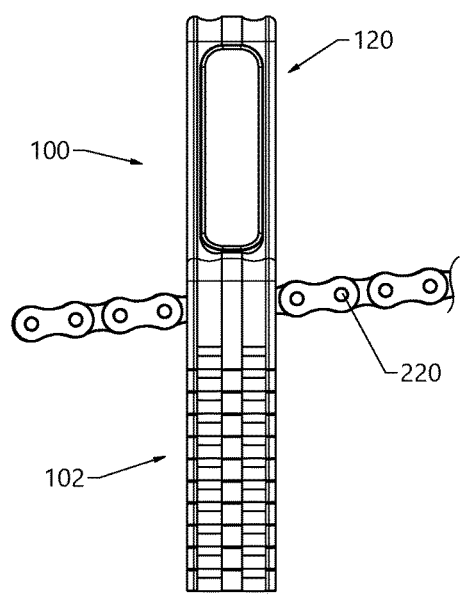
FIG. 7 is a front view of the chain damper and chain of FIG. 5.

Referring also to FIGS. 2-4, the chain damper 100 includes a base 102 having an attachment region 104 that is configured to be attached to a bicycle using any suitable technique. This may include using mechanical fasteners, chemical fasteners (e.g. glue or other adhesives), snap or frictional fits, magnets and the like.

In this example, the attachment region 104 includes a base surface 106 that is configured to contact and bear against the frame 202 of the bicycle 200. The base surface 106 may be of any desired shape and may be generally planar/flat as shown, or may be curved or otherwise configured to be complimentary to the shape of the frame section to which it is to be attached. The rest of the base 102 can extend away from the base surface 106 in a first direction illustrated by arrow 108 in FIG. 2. In some installations, the first direction 108 may be generally vertical and upwardly extending, for example if installed in position "A" in FIG. 15 or may be generally vertical by downwardly extending if installed position "B" in FIG. 15. In other installations the first direction 108 may be substantially horizontal when the chain damper 100 is installed, or may be inclined at an angle relative to the vertical and/or horizontal planes when in use.

In this example, the attachment region 104 also includes a plurality fastener apertures of spaced apart from each other and provided in the form of generally elongate slots 112 that extend through the body 102. Each slot 112 can be configured to receive a zip-tie or other suitable fastener that can be used to connect the base 102 to the bicycle frame 202.

Optionally, as shown in this example, the base 102 may include multiple pairs or sets of slots 112 that are spaced apart from each other in the first direction 108. This may allow a user to use any one or more of the sets of slots 112 that may best accommodate a given zip-tie length or other fastener-related consideration.

In some examples, the size of the base 102 may be modified by a user to help facilitate the use of a common chain damper 100 on a variety of differently sized and configured bicycles. Optionally, the base 102 may be configured to allow a user to cut portions of the base or otherwise modifying its characteristics to help customize the fit of the chain damper 100 for a given bicycle. In the illustrated example the base 102 is formed from a frangible material that a user can cut using common tools (such as a knife or saw), such as by cutting through plane 114 in FIG. 3 to remove some of the base material and sets of fastener slots 112. In these scenarios, the newly exposed end surface 106A of the base can function as the new base surface and at least some of the remaining slots 112 can be used to attach the chain damper 100 to the bicycle 200.

The chain damper 100 also includes a chain receiving portion 120 that extends from the base in generally the first direction 108 (e.g. upwards or downwards) and includes a chain damping surface 122 that includes a resiliently deformable damping material and at least partially bounds a chain receiving aperture 124. In this example the aperture 124 is entirely bounded by a generally continuous chain damping surface 122 that has substantially uniform properties along its length/perimeter such that the aperture 124 and chain 220 extending therethrough are entirely encircled/surrounding by the chain damping surface 122. In this configuration chain receiving aperture 124 is a closed aperture that encloses the chain 220 when the chain damper 100 is attached to the bicycle 200 and the chain may not be laterally or vertically removable from the chain receiving aperture 124 when the chain damper is attached to the bicycle 200. Instead, the chain 220 may be threaded through the aperture 124 when the damper 100 is being installed. This may help reduce the chances of the chain 220 escaping the aperture 124 when the damper 100 is in use.

In other embodiments the chain damping surface 122 need not bound the entire perimeter of the aperture 124 and at least some of the boundary of the perimeter may be formed by a surface or material that is different than the deformable damping material making up the chain damping surface 122. Similarly, the aperture 124 may optionally have a slit or other such structure that may allow the chain 220 to be laterally and/or vertically inserted into or removed from the aperture 124.

As shown in this example, the chain receiving aperture 124 is configured to be a generally tube-like structure that extends in an axial direction 128 which is selected so that the axial direction 128 is substantially parallel to the primary chain direction (see also FIG. 10) when the chain damper 100 is in use. In this arrangement the aperture 124 can be considered to extend substantially parallel to the chain direction. The chain receiving aperture 124 can define a length 130 in the axial direction that can be any desired length, and may preferably be between about 0.5 cm and about 40 cm, and may be between about 1 cm and about 10 cm and/or between about 2 cm and about 8 cm. Providing a longer length 130 may help increase the overall size and energy absorbing performance of the chain damper 100, but may also require a closer alignment of the axial direction 128 and the chain direction 222 when the chain damper 100 is in use to help prevent unwanted contact between the chain 220 and the chain damping surface 122 when the chain damper 100 is in use. That is, the chain damper 100 is configured so that when the chain damper 100 is attached to the bicycle i) the axial direction 128 is substantially aligned with the primary chain direction 222 and ii) the chain damping surface 122 is spaced apart from the chain travel path and chain 220 travelling thereon. In this configuration when the chain damper 100 is attached to the bicycle 200 and the chain 220 is travelling along the chain travel path the chain may be freely received within the chain receiving aperture 124 so that there is substantially no contact, and preferably no contact between the chain 220 and the chain damper 100 when the chain is traveling along its intended path. This may help reduce friction and other losses in the drive train and may help prolong the life of the chain damping surface 122.

The chain damping surface 122 is also preferably configured to be relatively closely spaced from the chain as it travels along its intended path and is positioned so that chain damping surface 122 will be contacted by the chain 220 when the chain 220 is laterally and/or vertically displaced from the chain travel path. This contact between the chain 220 and the chain damping surface 122 will preferably cause the material of the chain damping surface 122 to deform/deflect because of its deformable nature. This deformation of the chain damping surface 122 may absorb and thereby dissipate at least some of the kinetic energy from the chain 220. This may help constrain further displacement of the chain 220 from its intended path and my help reduce the amount of noise that is generated when the chain 220 contacts the chain damping surface 122 (as compared, for example, to contacting a metal or hard plastic surface).

Preferably, in addition to being generally deformable to help absorb energy, the chain damping surface 122 is also resilient and/or elastic, such that it can rebound from its deformation and exert a reaction force on the chain 220 that can help resiliently urge or bias the chain 220 back toward its intended, neutral chain travel path.

In some examples, such as the chain damper 100 illustrated, the chain engaging surface 122 may be formed substantially entirely from the preferred damping material, and may be of generally homogenous construction. Optionally, the entire chain receiving portion 120 may be formed from the same material as its inwardly facing chain engaging surface 122 and may be of integral, one-piece construction (such as being molded as a single part). In this embodiment substantially the entire, ring or tube-like structure of the chain receiving portion 120 may deflect and by laterally and/or vertically displaced when the chain engaging surface 122 is contacted by the chain 220. This may help provide a desired amount of deflection/energy absorption and/or help provide a desired resilient/biasing force. That is, the entire tube-like structure of the chain receiving portion 120 may bend and deflect from its neutral position (as illustrated) when contacted by the chain 220 and then may resiliently spring back to its neutral position, thereby helping to return the chain 220 to is travel path.

In this example, the chain damping material forming the chain receiving portion 120 and the chain engaging surface 122 is selected to have a durometer of between about 10 Shore A and about 90 Shore A, and may include at least one of rubber, plastic, silicone, TPU (thermo plastic poly urethane) and a combination thereof.

Optionally, for example to help facilitate manufacturing, substantially the entire chain damper 100 may be of integral, one-piece construction (e.g. commonly molded). As the material properties of the chain damping surface 122 may be more relevant than the properties of the base 102 in some embodiments, if the entire chain damper 100 is to be of integrally formed, one-piece construction it may all be formed from the chain damping material.

If the chain damper is intended to be used with a bicycle that has only a single sprocket 216 on its rear cassette 214 then the aperture 124 may only need to be sized to accommodate a single chain travel path. Alternatively, the bicycle may be configured to have multiple rear sprockets 216 and as the bicycle is in use the chain may be shifted and move between the variety of sprockets 216. In this arrangement the bicycle chain 220 may define two or more different chain travel paths when in normal, non-disturbed use. While several paths may be provided in a given cassette, for the purposes of discussion this description will focus on the location of the chain when it is riding on the inner-most and outer-most sprockets as this can define the limits of the intended chain travel positions, with other sprockets placing the chain somewhere between these inner and outer-most positions.

For example, referring also to FIGS. 5-10, in the example illustrated the chain 200 is movable at least laterally and preferably also vertically moveable between an inboard travel path 230 (FIGS. 2 and 8-10) in which it engages an inboard most sprocket of the cassette 214 and an outboard travel path 232 (FIGS. 2 and 5-7) in which it engages an outboard most sprocket of the cassette 214. The inboard travel path 230 may be spaced from a plane 240 extending parallel to the first direction 108 by an inboard lateral distance 242 and from a generally horizontal reference plane 244 by an inboard vertical distance 246. The outboard travel path 232 may be spaced from the plane 240 by an outboard lateral distance 248 that is less than the inboard lateral distance 242, and from the plane 244 by an outboard vertical distance 250 that is less than the inboard vertical distance 246.

Figure 11:
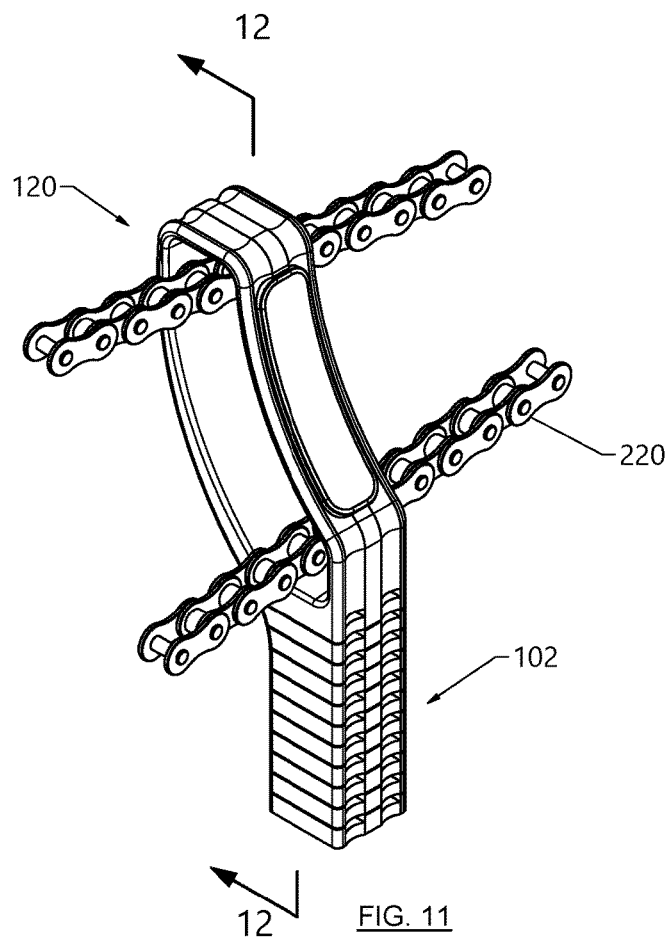
FIG. 11 is a perspective view of the chain damper of FIG. 1 with chains shown schematically in upper and lower positions.
Figure 12:
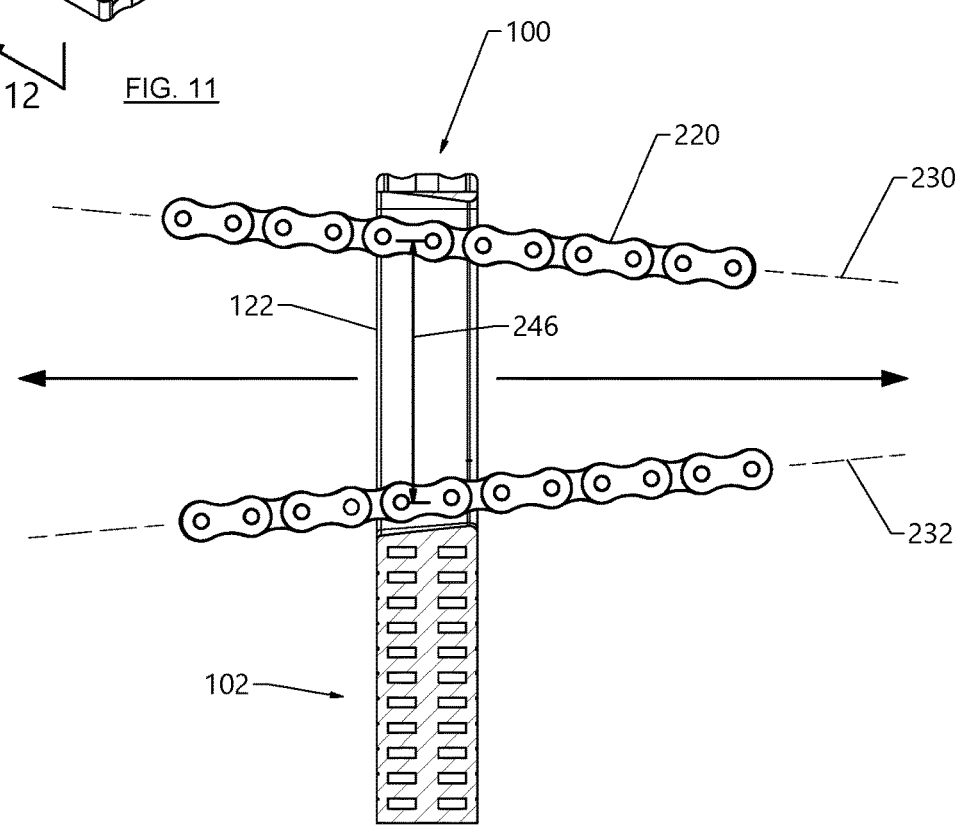
FIG. 12 is a cross-sectional view taken along line 12-12 in FIG. 11.

A lateral or horizontal offset distance 234 can be defined by inboard and outboard travel paths 230 and 232, along with a vertical offset distance 236. These distances may be between about 1 cm and about 10 cm or more depending on the bicycle design and may help define the dimensions and shape of the complimentary-shaped aperture 124. A chain transition path 238 can define the range of motion of the chain 220 as it moves between the inboard and outboard travel paths 230 and 232. This transition path 238 may be generally linear or, as shown, may be arcuate or curved when viewed in a plane that is orthogonal to the primary chain direction 222. In the illustrated embodiment, the transition path 238 is not parallel to the axial direction 128 or the first direction 108, and instead is arrange to intersect the first direction 108 at an angle (angle 241 see FIG. 2) that is between about 0 degrees and about 90 degrees. FIGS. 11-12 show the chain 220 superimposed in both the inboard and outboard travel paths 230 and 232 for illustrative purposes and these are also shown schematically for reference in FIG. 2.

Preferably if the chain 200 is movable in this manner then the chain receiving aperture 124 is configured to have a complimentary shape and can include an inboard region 136 (see also FIG. 11A) configured to freely receive the chain 220 when in the inboard travel path 230 and an outboard region 138 configured to freely receive the chain 220 when in its outboard travel path 232, and has the interior space/area to accommodate the chain 220 when it is disposed at any position along its transition path 238 while having an adequate spacing between the chain engaging surface 122 and the chain 220. That is, if the transition path 238 is expected to be curved then at least a portion of the chain damping surface 122 may be curved or arcuate and may be configured to have a shape that is complimentary to a shape of the chain transition path 238 so that the chain engaging surface 122 remains at generally the same distance from the chain 220 when the chain 220 is moved along the transition path 238.

Figure 11A:
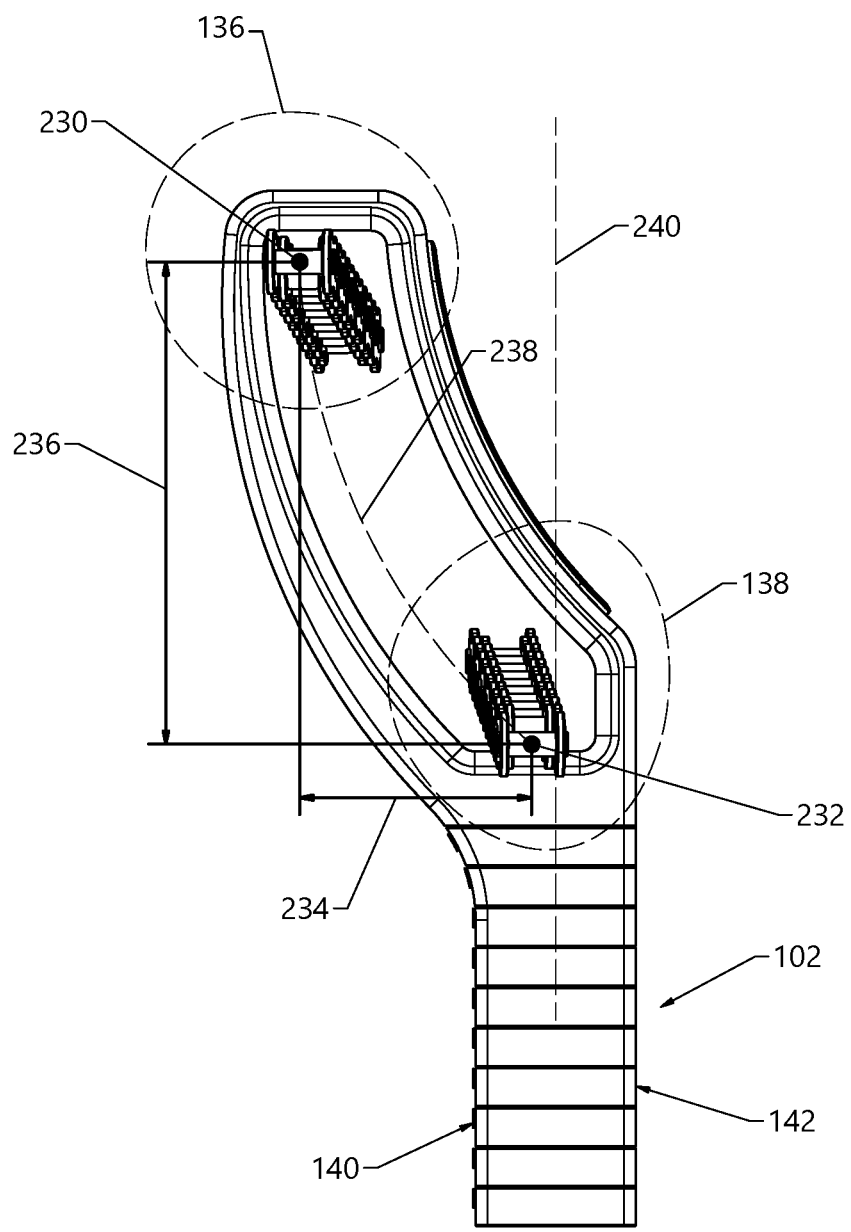
FIG. 11A is a side view of the chain damper and chains of FIG. 11.

Because the chain 220 moves laterally when traveling along the transition path 238, the outboard region 138 may be disposed so as to be at least partially laterally offset from the inboard region 136, and may be disposed between the inboard region 136 and the base 102 in the first direction 108 (e.g. spaced both horizontally and vertically from the outboard region 138). In this embodiment, the base 102 is configured to include an inboard face 140 that generally faces the bicycle 200 when the chain damper 100 is attached to the bicycle 200 and an opposing outboard face 142 (FIG. 11A). In this embodiment, at least a portion of chain engaging surface 122 is disposed inboard of the inboard face 140 of the base 102, whereas the inboard face 140 is disposed laterally between the inboard and outboard travel paths 230 and 232. This may help position the aperture 124 in a desired lateral position while still allowing the base 102 to be aligned with a structural member of the bicycle 200.

As the chain damper 100 may be useful to help inhibit deflection of the chain 220 away from its intended travel path, it may be preferable in some embodiments to position the chain damper 100 at a location on the bicycle 200 where the lateral and/or vertical deflection of the chain 220 may be expected to be relatively high. For example, as the chain 220 is engaged by the rear cassette 214 and chain ring 210 but is relatively unsupported therebetween, it may be desirable to position the chain damper 100 at a location that is between the cassette 214 and chain ring 210 in the primary chain direction 220. Preferably, the chain damper 100 can be positioned at an intermediary distance 254 that is between about 30% and about 70% of the total distance 256 (FIG. 15) between the chain ring 210 and cassette 214. More preferably, the intermediary distance 254 may be between about 40% and about 60% of the distance 256, and may be approximately 50% of the distance 256. The attachment region 104 may be configured to be attached to a frame 202 of the bicycle 200 at a suitable location between chain ring 210 and the cassette 214.

Figure 16:
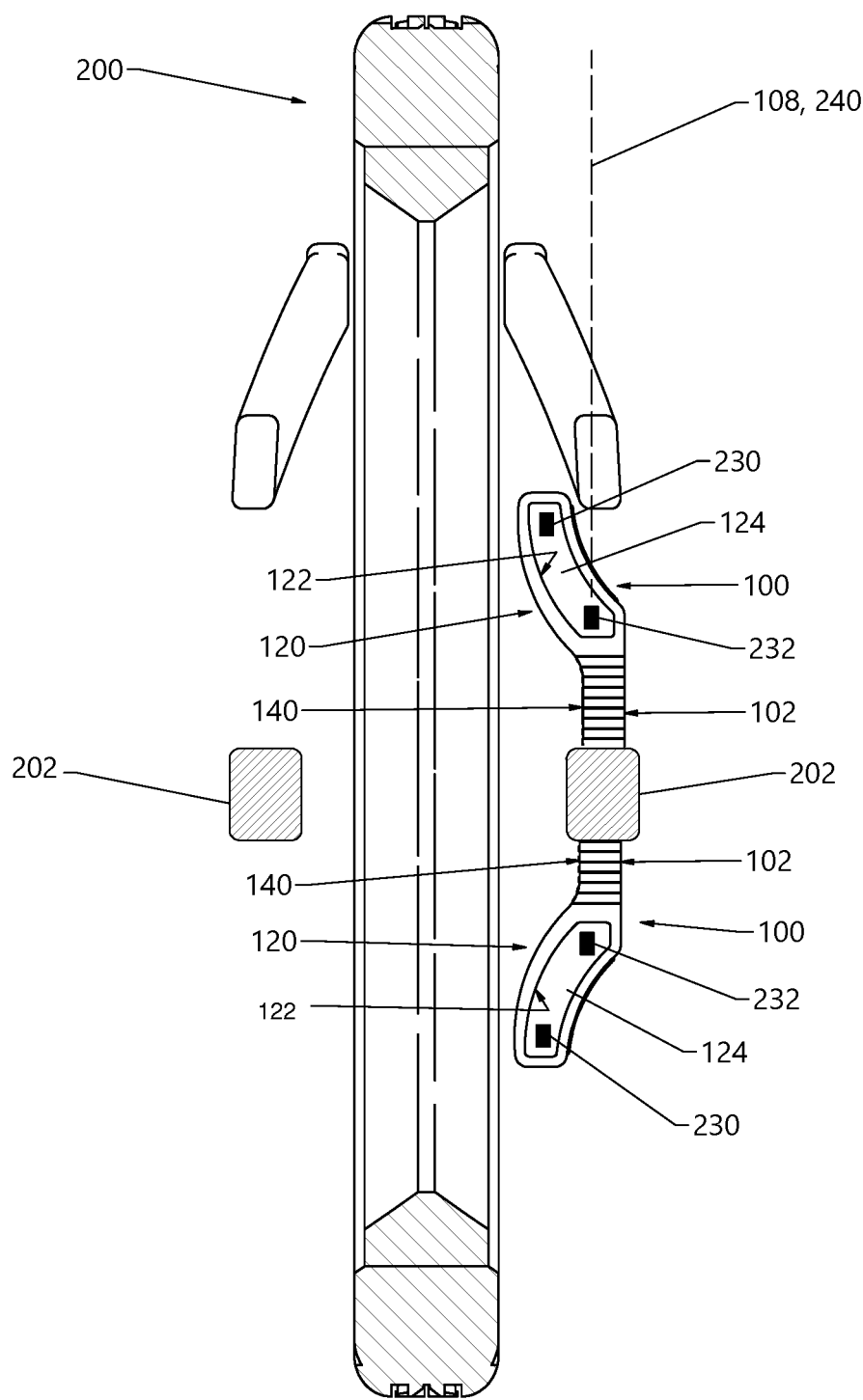
FIG. 16 is a cross-sectional view taken along line 16-16 in FIG. 15.
Figure 19:
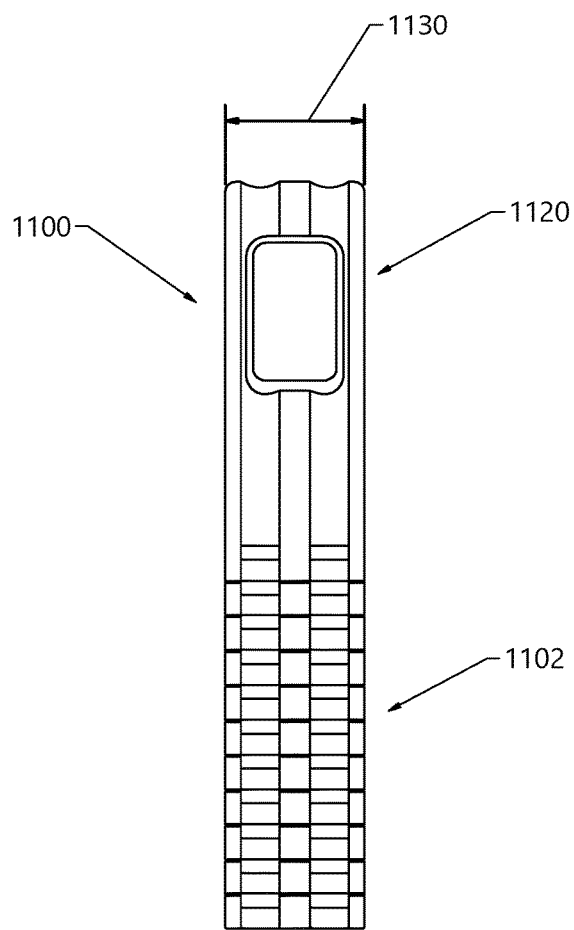
FIG. 19 is a perspective view of another example of a chain damper.
Figure 20:
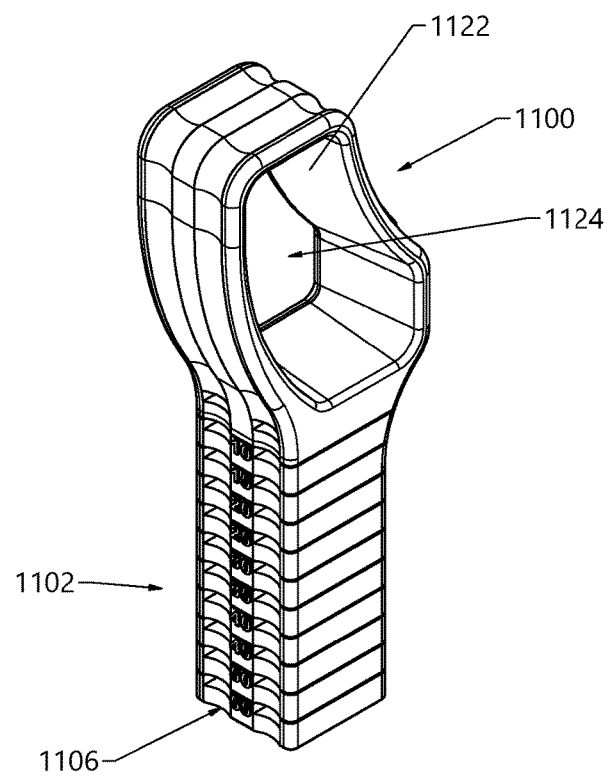
FIG. 20 is a side view of the chain damper of FIG. 19.

Optionally, the chain damper 100 may be installed to extend generally upwardly or downwardly from the frame 202 of the bicycle 200, as shown in FIGS. 15 and 16.

Optionally, two or more chain dampers 100 may be installed on a single bicycle 200 to help engage and damp the chain 220 in two or more separate locations. This may help further dampen the chain 220 as compared to using only a single chain damper 100. As shown in FIGS. 15 and 16, the two chain dampers 100 may be installed to extend in opposite directions. To accommodate the different distance of the chain 220 from the frame 202 in these arrangements the bases 102 of the chain dampers 100 illustrated have been modified as described herein, such that the chain damper 100 on the upper side of the frame 202 has a shorter base (in the first direction 108) than the chain damper 100 on the lower side of the frame 202.

Figure 13:
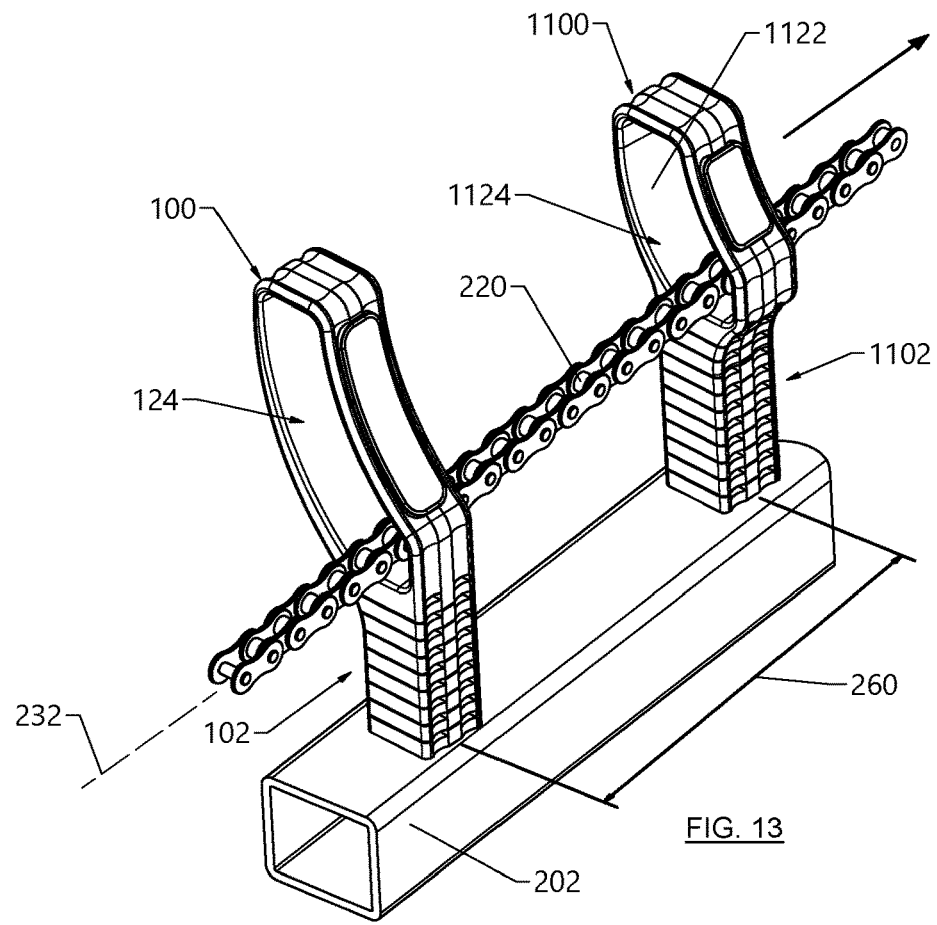
FIG. 13 is a perspective view showing two examples of chain dampers receiving a chain in a lower position.
Figure 14:
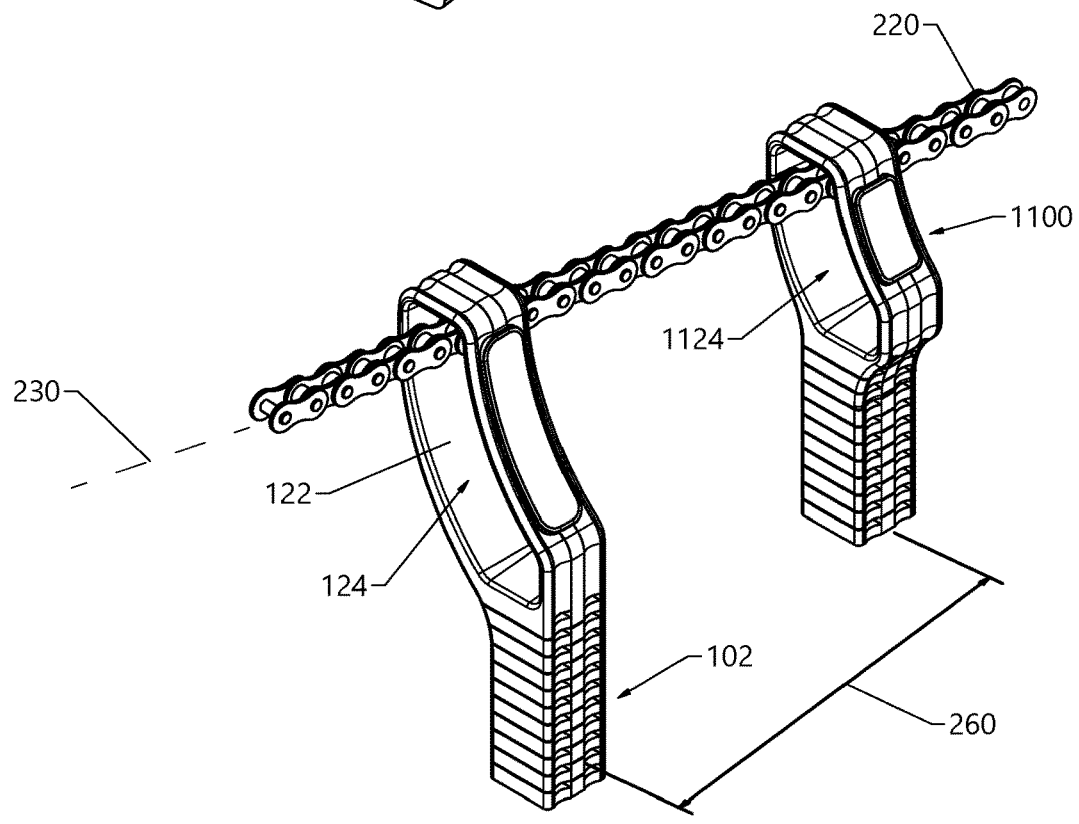
FIG. 14 is the perspective view of FIG. 13 with the chain in the upper position.

Alternatively, or in addition to providing chain dampers 100 on opposite sides of the frame 202, two or more chain dampers may be positioned beside each other and while extending in the same direction from the frame 202. This may help contact the chain 220 at two or more locations on the same side of the frame 202 and may help increase the overall amount of damping that is provided. The chain dampers used in this arrangement may be identical or may be of different configurations to help account for their mounting in different locations. For example, referring to FIGS. 13 and 14, a chain damper 100 is shown installed next to an alternative example of a chain damper 1100 (as described herein) such that both dampers 100, 1100 extend generally upwardly from the frame 202. The dampers 100, 1100 are spaced from each other by a paring distance 260 that can any suitable distance, and may be between about 10% and about 50% of the overall distance 256 (FIG. 15) and may be between about 5 cm and about 25 cm in some examples.

Optionally, the damping material forming the chain damping surface 122 may include a surface coating and/or chain conditioning material, such as a lubricant or the like, that can be transferred to the chain 220 when the chain 220 contacts the chain engaging surface 122.

Referring to FIGS. 17-20, another example of a chain damper 1100 is illustrated. The chain damper 1100 is generally analogous to the chain damper 100 and like features are identified using like reference characters indexed by 1000. In this example the chain receiving aperture 1124 has a different shape than aperture 124 and is shaped to generally accommodate the differently positions inboard and outboard travel paths 1230 and 1232 and associated transition path 1238. In this example, the outboard travel path 1232 is disposed outboard of the plane 1240.

Optionally, instead of configuring the entire chain receiving portion 120 to be resiliently deformable some examples of the chain receiving portions (and/or other portions of the damper) may include a frame that can be made from a different material than the chain engaging surface 122. This frame may help provide a desired structural strength to the chain receiving portion and may be stronger and/or stiffer than the damping material. Preferably, the frame can be positioned within the chain receiving portion and at least its inwardly face surfaces can be covered with the chain engaging material so that the harder frame material does not directly contact the chain 220 when the damper is in use. This configuration may allow the chain engaging surface to deform when contacted by the chain while the frame may remain substantially rigid. This may provide a desired level of damping/energy absorption while also limiting the maximum displacement of the chain and/or helping to hold the chain receiving portion in a desired shape without sagging, etc.

Referring to FIG. 18, one example of a possible frame 1170 is shown schematically as being disposed within the chain receiving portion 1120 and being coated with the chain damping material that forms the chain engaging surface 1122. The frame 1170 may be formed from a frame material that is stiffer than the chain damping material and at least partially supports the chain damping surface 1122. For example, the frame material may have a durometer of between about 40 Shore D and about 100 Shore D and may be made of a material, such as metal or hard plastic, that would not be suitable for the chain engaging surface 1122. Alternatively, instead of being internal as shown, the frame 1170 may be at least partially exposed on the outer portions of the chain engaging portion 1120 and may form part of the outer surface of the chain damper 1100. Frames of this nature may be used in combination with any version of the chain dampers, including those described herein.

Figure 21:
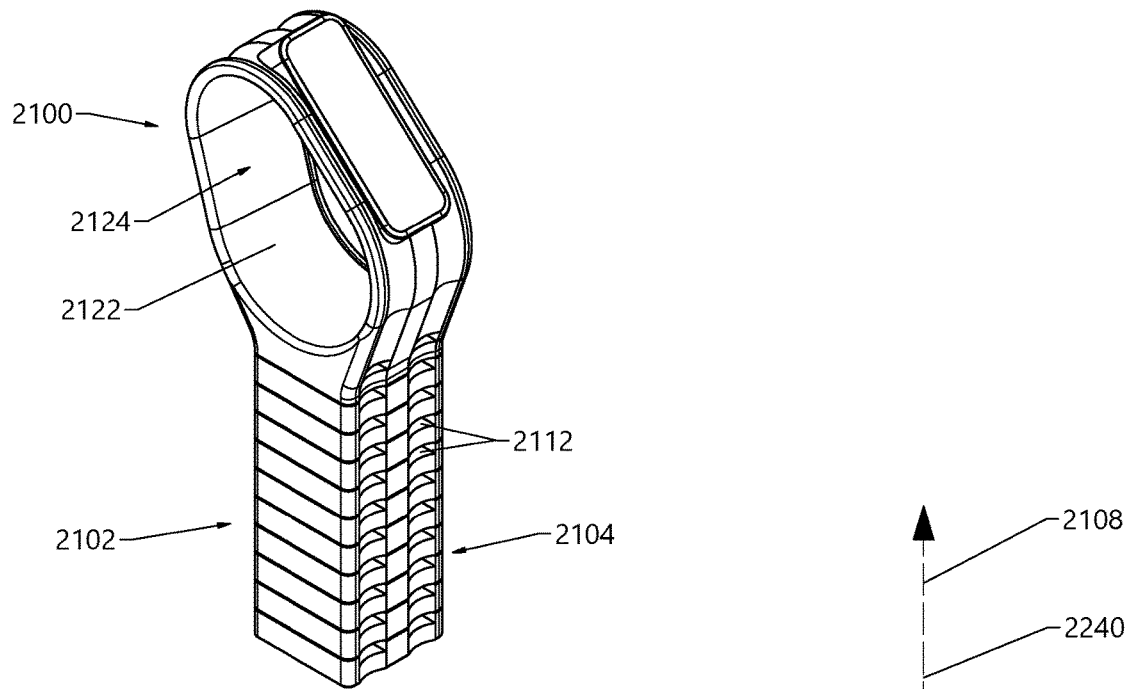
FIG. 21 is a perspective view of another example of a chain damper.
Figure 22:
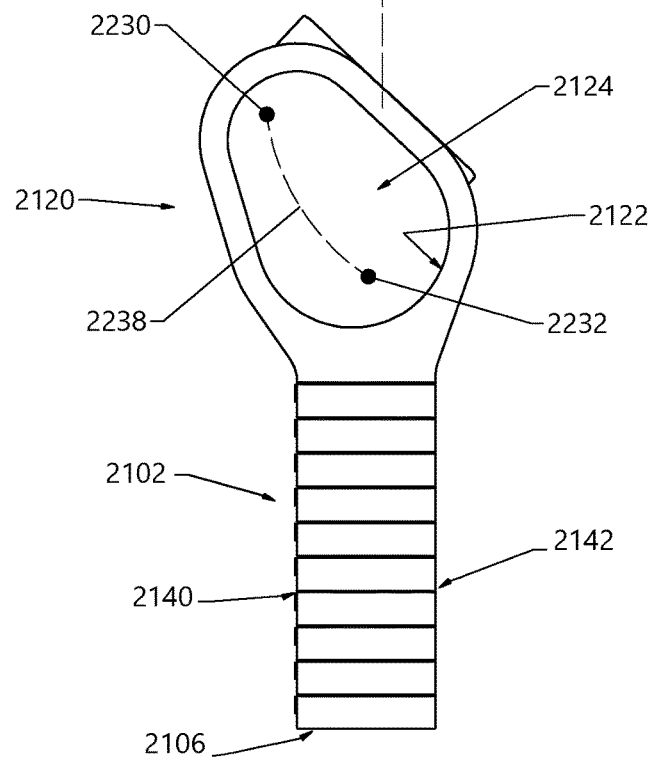
FIG. 22 is a side view of the chain damper of FIG. 21.

Referring to FIGS. 21 and 22, another example of a chain damper 2100 is illustrated. The chain damper 2100 is generally analogous to the chain damper 100 and like features are identified using like reference characters indexed by 2000. In this example the chain receiving aperture 2124 has a different shape than aperture 124 and is shaped to generally accommodate the differently positions inboard and outboard travel paths 2230 and 2232 and associated transition path 2238.

Figure 23:
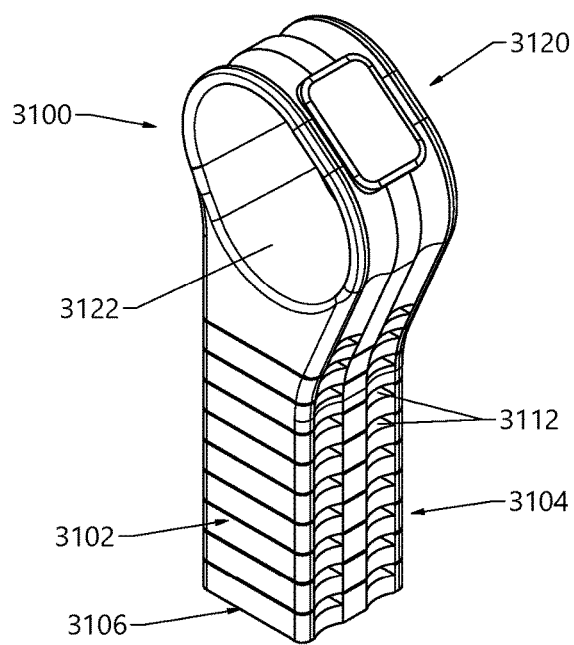
FIG. 23 is a perspective view of another example of a chain damper.
Figure 24:
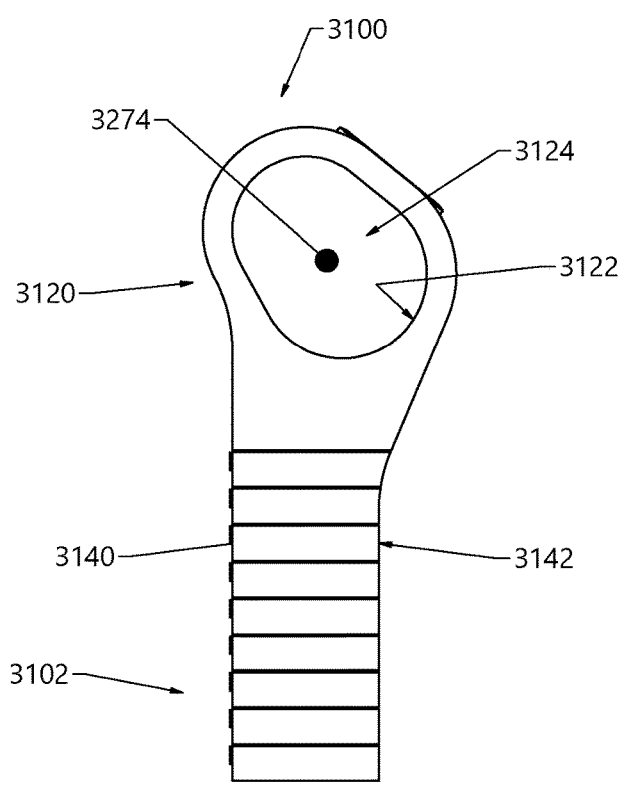
FIG. 24 is a side view of the chain damper of FIG. 23.

Referring to FIGS. 23 and 24, another example of a chain damper 3100 is illustrated. The chain damper 3100 is generally analogous to the chain damper 100 and like features are identified using like reference characters indexed by 3000. In this example the chain receiving aperture 3124 has a relatively smaller area than the other examples described herein and may be suited to accommodate a bicycle with only a single rear sprocket and a single, common chain travel path 3274.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent, or patent application was specifically and individually indicated to be incorporated by reference in its entirety.

What is claimed is:

1. A chain damper for use with a bicycle having a chain extending in a primary chain direction between a chain ring and a rear cassette and moving along a chain travel path, the chain damper comprising:
    a) a base having an attachment region that is configured to be attached to a bicycle;
    b) a chain receiving portion extending from and fixed relative to the base in a first direction and comprising a chain damping surface that comprises a resiliently deformable damping material and at least partially bounds a chain receiving aperture and is configured to have a shape that is complimentary to a shape of a chain transition path defined by movement of the chain between an inboard travel path and an outboard travel path, the chain receiving aperture extending in an axial direction and being configured so that when the chain damper is attached to the bicycle, the axial direction is substantially aligned with the primary chain direction and the chain damping surface is spaced apart from the chain travel path;
    whereby when the chain damper is attached to the bicycle and the chain is travelling along the chain travel path, the chain is freely received within the chain receiving aperture and the chain damping surface is positioned so as to be contacted and deformed by the chain when the chain is laterally displaced from the chain travel path thereby dissipating at least some kinetic energy from the chain and to resiliently urge the chain back toward the chain travel path.

2. The damper of claim 1, wherein the chain is at least laterally moveable between the inboard travel path in which it engages an inboard most sprocket of the rear cassette and outboard travel path in which it engages an outboard most sprocket of the rear cassette and the chain receiving aperture includes an inboard region configured to freely receive the chain when in the inboard travel path and an outboard region configured to freely receive the chain when in the outboard travel path.

3. The damper of claim 2, wherein the outboard region is laterally offset from the inboard region and is disposed between the inboard region and the base in the first direction.

4. The damper of claim 2, wherein at least a portion of the chain damping surface is arcuate.

5. The damper of claim 1, wherein the base comprises an inboard face that generally faces the bicycle when the chain damper is attached to the bicycle and an opposing outboard face, and wherein at least a portion of the chain damping surface is disposed inboard of the inboard face.

6. The damper of claim 1, wherein the chain damping surface is formed substantially entirely from the resiliently deformable damping material.

7. The damper of claim 6, wherein the chain receiving portion is formed substantially entirely from the resiliently deformable damping material and wherein at least a portion of the chain receiving portion is laterally displaceable when contacted by the chain.

8. The damper of claim 1, wherein the resiliently deformable damping material has a durometer of between about 10 Shore A and about 90 Shore A.

9. The damper of claim 1, wherein the resiliently deformable damping material comprises at least one of rubber, plastic, silicone, TPU (thermo plastic poly urethane) and a combination thereof.

10. The damper of claim 1, wherein the chain damping surface surrounds the entire chain receiving aperture.

11. The damper of claim 1, wherein the chain receiving portion is of integral, one-piece construction.

12. The damper of claim 11, wherein the chain damper is of integral, one-piece construction and is formed from the resiliently deformable damping material.

13. The damper of claim 1, wherein the chain receiving aperture is a closed aperture that encloses the chain when the chain damper is attached to the bicycle whereby the chain is not laterally or vertically removable from the chain receiving aperture when the chain damper is attached to the bicycle.

14. The damper of claim 1, wherein the chain receiving portion comprises a frame that is formed from a frame material that is stiffer than the resiliently deformable damping material and at least partially supports the chain damping surface.

15. The damper of claim 14, wherein the frame material has a durometer of between about 40 Shore D and about 100 Shore D.

16. The damper of claim 1, wherein the attachment region is configured to be attached to a frame of the bicycle between chain ring and the rear cassette in the first direction.

17. The damper of claim 1, wherein the attachment region comprises a base surface configured to bear against a frame of the bicycle and a fastening portion having at least one fastener aperture configured to receive a fastener to secure the base to the frame.

18. The damper of claim 1, wherein the attachment region comprises a least a first fastener aperture and a second fastener aperture spaced apart from each other in the first direction.

19. The damper of claim 1, wherein the chain receiving aperture has a length in the axial direction that is between 0.5 cm and 10 cm.

20. The damper of claim 1, wherein the resiliently deformable damping material comprises a lubricant that can be transferred to the chain when the chain contacts the chain damping surface.

* * * * *